(12) United States Patent
Sharma et al.

(10) Patent No.: US 11,606,301 B2
(45) Date of Patent: Mar. 14, 2023

(54) VERIFYING INTENTS IN STATEFUL NETWORKS USING ATOMIC ADDRESS OBJECTS

(71) Applicant: Hewlett Packard Enterprise Development LP, Houston, TX (US)

(72) Inventors: Puneet Sharma, Palo Alto, CA (US); Huazhe Wang, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 543 days.

(21) Appl. No.: 16/392,160

(22) Filed: Apr. 23, 2019

(65) Prior Publication Data

US 2020/0344171 A1 Oct. 29, 2020

(51) Int. Cl.
| | |
|---|---|
| *H04L 47/20* | (2022.01) |
| *H04L 9/40* | (2022.01) |
| *H04L 69/22* | (2022.01) |
| *H04L 47/125* | (2022.01) |

(52) U.S. Cl.
CPC ............ *H04L 47/20* (2013.01); *H04L 47/125* (2013.01); *H04L 63/0254* (2013.01); *H04L 69/22* (2013.01)

(58) Field of Classification Search
CPC ... H04L 47/20; H04L 47/125; H04L 63/0254; H04L 69/22
See application file for complete search history.

(56) References Cited

U.S. PATENT DOCUMENTS

| | | | |
|---|---|---|---|
| 7,970,746 B2 | 6/2011 | Seshadri et al. | |
| 8,352,630 B2 | 1/2013 | Hart | |
| 9,722,856 B2 | 8/2017 | Nagasubramaniam et al. | |
| 10,484,297 B1* | 11/2019 | McClenahan | ............ H04L 67/34 |
| 10,659,298 B1* | 5/2020 | Harneja | .............. H04L 41/0866 |
| 2002/0178246 A1 | 11/2002 | Mayer | |
| 2006/0164980 A1* | 7/2006 | Guru | ................... H04L 47/2408 370/229 |

(Continued)

FOREIGN PATENT DOCUMENTS

| | | |
|---|---|---|
| CN | 102461089 A | 5/2012 |
| CN | 103069772 A | 4/2013 |

(Continued)

OTHER PUBLICATIONS

Yang et al., "Real-time verification of network properties using Atomic Predicates", 21st IEEE International Conference on Network Protocols (ICNP), 2013, 11 pages.

(Continued)

*Primary Examiner* — Patrice L Winder
*Assistant Examiner* — Angela M Widhalm De Rodriguez
(74) *Attorney, Agent, or Firm* — Hewlett Packard Enterprise Patent Department (57) ABSTRACT

Example method includes: receiving a plurality of intent-based network policies in a network, wherein each intent-based policy comprises at least a rule and an action to be performed by a network function on a network packet in response to the rule being matched; identifying a set of header address spaces comprising a plurality of addresses that match to a same set of rules and actions; creating an atomic address object representing the identified set of header address spaces; and verifying the plurality of intent-based network policies using the atomic address object.

22 Claims, 5 Drawing Sheets

(56) References Cited

U.S. PATENT DOCUMENTS

| | | | |
|---|---|---|---|
| 2008/0037539 A1* | 2/2008 | Paramaguru | H04L 45/742 370/392 |
| 2009/0287933 A1* | 11/2009 | Beckwith | H04L 9/3255 713/176 |
| 2012/0131155 A1 | 5/2012 | Madey et al. | |
| 2013/0227638 A1* | 8/2013 | Giambiagi | G06F 21/00 726/1 |
| 2014/0369209 A1 | 12/2014 | Khurshid et al. | |
| 2015/0020147 A1* | 1/2015 | Krishnan | G06F 21/6218 726/1 |
| 2015/0358290 A1 | 12/2015 | Jain et al. | |
| 2016/0099867 A1 | 4/2016 | Guichard et al. | |
| 2016/0173371 A1 | 6/2016 | Bays et al. | |
| 2016/0241436 A1 | 8/2016 | Fourie et al. | |
| 2017/0208100 A1 | 7/2017 | Lian et al. | |
| 2017/0222995 A1* | 8/2017 | Ylonen | H04L 63/0435 |
| 2017/0346684 A1 | 11/2017 | Ratkovic et al. | |
| 2017/0359254 A1* | 12/2017 | Oran | H04L 67/327 |
| 2018/0077037 A1 | 3/2018 | Zhang et al. | |
| 2018/0145879 A1 | 5/2018 | Cook et al. | |
| 2018/0176096 A1 | 6/2018 | Prabakaran et al. | |
| 2019/0068598 A1 | 2/2019 | Kang et al. | |
| 2019/0280969 A1* | 9/2019 | Liu | H04L 45/48 |

FOREIGN PATENT DOCUMENTS

| | | | |
|---|---|---|---|
| WO | 2016/072996 A1 | 5/2016 | |
| WO | WO-2016199404 | 12/2016 | |
| WO | 2017/095391 A1 | 6/2017 | |
| WO | WO-2017131765 | 8/2017 | |

OTHER PUBLICATIONS

Prakash et al., "PGA: Using Graphs to Express and Automatically Reconcile Network Policies," Proceedings of the 2015 ACM Conference on Special Interest Group on Data Communication, 2015, pp. 29-42.

Panda et al., "Verifying reachability in networks with mutable datapaths", 14th USENIX Symposium on Networked Systems Design and Implementation, 2017, pp. 699-718.

OpenConfig, "Vendor-neutral, model-driven network management designed by users", available online at <http://openconfig.net>, 2016, 1 page.

Malik et al., "Boolean satisfiability from theoretical hardness to practical success", Communications of the ACM, vol. 52 No. 8, Aug. 2009, pp. 76-82.

M. Bjorklund, Ed., "Yang—A Data Modeling Language for the Network Configuration Protocol (NETCONF)", Internet Engineering Task Force (IETF), Request for Comments: 6020, Oct. 2010, 173 pages.

Kazemian et al., "Header space analysis: static checking for networks", Proceedings of the 9th USENIX conference on Networked Systems Design and Implementation, 2012, 14 pages.

Hares Huawei S., "Intent-Based Nemo Overview; draft-hares-ibnemo-overview-01.txt". Intent-Based Nemo Overview; draft-hares-ibnemo-overview-81.txt, Internet Engineering Task Force, IETF Standardworkingdraft, Internet Society (ISOC) 4, Rue Des Falaises CH—1285, Geneva, Switzerland, Oct. 20, 2015 (2015-18-28), pp. 1-23.

De Moura et al., "Z3: An efficient SMT solver", In: Ramakrishnan C.R., Rehof J. (eds) Tools and Algorithms for the Construction and Analysis of Systems. TACAS 2008, Lecture Notes in Computer Science, vol. 4963, pp. 337-340.

De Moura et al., "Satisfiability modulo theories: introduction and applications", Communications of the ACM, vol. 54, Issue 9, Sep. 2011, pp. 69-77.

Beckett et al., "A general approach to network configuration verification", Proceedings of the Conference of the ACM Special Interest Group on Data Communication, 2017, 14 pages.

Arezoumand Saeed et al., "MD-IDN: Multi-domain intent-driven networking in software-defined infrastructures", 2017 13th International Conference on Network and Service Management (CNSM), I FI P, Nov. 26, 2017 (Nov. 26, 2017), pp. 1-7.

Abhashkumar, A. et al., Supporting Diverse Dynamic Intent-based Policies using Janus, (Research Paper), Dec. 12-15, 2017, 14 Pgs.

Fayaz, S.K. et al., Buzz: Testing Context-Dependent Policies in Stateful Networks, (Research Paper), May 16, 2016, 15 Pgs.

Szyrkowiec, T. et al., Optical Network Models and Their Application to Software-Defined Network Management, (Research Paper), Sep. 14, 2017, 7 Pgs.

Open Networking Foundation, "Intent NBI—Definition and Principles", ONF TR-523, 2016, 20 pages.

\* cited by examiner

| Atomic Address Object 300 | Header Address Space 320 | Shared Actions 340 |
|---|---|---|
| $AAO_1$ 350 | $I_4$ | $p_1$ AND $p_2$ AND $p_3$ |
| $AAO_2$ 352 | $I_3 \cup I_5$ | $p_1$ AND $p_2$ |
| $AAO_3$ 354 | $I_1$ | $p_1$ AND $p_3$ |
| $AAO_4$ 356 | $I_0 \cup I_2 \cup I_6$ | $p_1$ |
| ... ... | ... ... | ... ... |

VERIFYING INTENTS IN STATEFUL NETWORKS USING ATOMIC ADDRESS OBJECTS

BACKGROUND

Network intents generally refer to high level policy objectives of a network. One example of the network intents may be the reachability, which implies that one endpoint in an intent-based network should be able to access another endpoint in the intent-based network. In a stateful network, network functions conduct stateful behaviors rather than static behaviors. Therefore, the processing of network packets in a stateful network is not limited to the processing of the packet headers and packet payloads. Rather, the processing of the network packets may also be based on packet history that a network device including an endpoint observed in the past. As such, it may be difficult to debug and verify the intent-based network policies. In particular, it is difficult to verify that the translation from the intent-based policies to the network configurations is correct.

BRIEF DESCRIPTION OF THE DRAWINGS

The following detailed description references the drawings, wherein.

DETAILED DESCRIPTION

Network intents generally refer to desired outcomes driven by business objectives in terms of what is needed from a target network instead of low-level implementations. Network intents can be expressed with technology-agnostic terms, such as, logical labels or tags (e.g., all critical services in the data center are available to remote sites.), whereas low-level configurations are implemented with technology-specific addresses or commands, such as, Internet Protocol (IP) address, Media Access Control (MAC) address, command language interpreter (CLI) network command, etc.

Conventionally, intent-based network policies are translated into configurations that are pushed to the network devices in a network for implementation of these policies. It is important to verify that the translation from the intent-based policy to the network configuration is correct. The intent-based network policies typically apply to end-to-end network flows, whereas the configurations are applied to each individual network devices. If one of the network devices associated with a network flow is incorrectly configured, the intent-based policy may not be correctly instantiated.

To ensure configurations match intents, intents as well as the network may be encoded as constraints for modern solvers, such as, Satisfiability (SAT) solver, Satisfiability Modulo Theories (SMT) solver, etc. The intent verification system can then call the solver to proactively check the correctness of configurations.

Stateful networks refer to networks that contain stateful Network Functions (NFs). Compared with switches and routers, NFs implement more diverse functions and their packet behavior may depend on the packet history they have encountered. Examples of NFs may include firewalls that allow inbound packets if they belong to established connections and web proxies that cache popular content. As packets may have different behavior at stateful NFs when they arrive in different sequences, the verification of stateful networks further requires to model temporal relations between packets as constraints when modern solvers are used.

The modern solvers may not effectively solve large scale problems. Existing solver-based network verification solutions either do not support temporal modeling so cannot be used to model stateful networks, or check network intents at host-level which can only support limited types of intents. Equivalence classes have been studied in the verification of stateless networks, in which packets having the same network-wide forwarding behavior are grouped into the same forwarding equivalence class. However, the reliance on customized graph-based algorithms to check end-to-end network properties for each equivalence class renders those solutions unable to model extra packet sequences, and thus cannot be used for stateful networks. Examples of the present disclosure include techniques to apply the equivalence classes to solver-based verification of stateful networks.

More specifically, we identify address groups that match the same set of NF processing rules to form an equivalence class. Note that packets with such addresses may have different behavior due to stateful processing at NFs. One aspect of network intents is End Point Groups (EPGs). EPGs are created to allow easy application of network policy rules to specific set of endpoints. In an intent-based stateful network, the intents can be specified with respect to EPGs. For example, one intent-based policy may be that "a guest network should not be able to reach data center." In this example, assuming that the guest network has 100 hosts and the data center has 1,000 servers. To check this intent, this query may be expressed as 100,000 separate queries with each separate query checking reachability from one of the 100 hosts to one of the 1,000 data center servers. Given that NF processing policy commonly partitions end hosts into policy equivalence groups, e.g., into a set of end hosts, to which the same policy applies, queries for end hosts related to the same policy can be aggregated. Therefore, atomic address objects can be created to refer to this compact group level representation. Instead of verifying intent-based policy on each address associated with each individual network device in the network, the atomic address objects group a set of individual network devices together to perform intent-based policy verification on all of the network devices in the set in a single verification process. Specifically, the atomic address objects can bundle the set of individual network devices together based on various properties, such as, IP addresses, etc. The atomic address objects not only provide high efficiency but also facilitate intent checking in stateful networks.

The introduction of atomic address objects provides two functionalities in the intent-based policy verification process:

1. Header Matching Elimination

Most NFs decide processing actions for incoming packets by matching packet headers against processing rules. In an example, packets are routed based on destination address. When a router determines which hop a particular packet should be forwarded to, the router can perform an IP lookup in the forwarding information base (FIB) table. Each entry of the FIB table includes an address, which may be a prefix of IP addresses. However, address-based aggregation may be limited to stateless networks, and may not work in the stateful networks. One way to represent a packet and a processing rule for this check is to use bit vectors and check for equality using a bit mask. Nevertheless, bit vectors are expensive and solvers typically convert them to SAT.

To address this issue, in some examples, the matching fields of processing rules can be represented as a set of integers. The integers are identifiers for atomic address objects. Then, the header matching at the NFs can be converted to membership checking for the set of integers. For processing rules that modify packet headers (e.g., NAT rule), the modified addresses are also represented as one or more atomic address objects. Depending on a deterministic (e.g., one to one mapping) or nondeterministic (e.g., one to multiple mapping) modification, an atomic address object can be mapped to a certain or random atomic address object.

2. Reachability for Temporal Modeling

Modern solvers tend to return a single solution when the set of constraints are satisfiable. Sometimes, all solutions may be desired for a query, e.g., to verify a policy "all hosts in marketing department should be able to reach a particular web service." For static modeling, this can be solved by testing satisfiability of the negation of a reachability formula, i.e., if there exist any host the marketing department cannot access the particular web service. However, using the temporal modeling, the negation can be satisfied either with a packet that would be blocked in the network, or a packet history that could not have existed because it violates the casual precedence constraints. Therefore, an intent-based policy verification system need to differentiate between these, and find only true packet loss. To do this, the system needs to avoid negating the formula and check a reachability intent directly, which would generate a large of number of queries that correspond to each pair of end hosts specified in the intent. With atomic address objects, the number of queries is significantly reduced because the checking of the results can be applied to all end hosts that belong to the same atomic address object.

Figure 1:
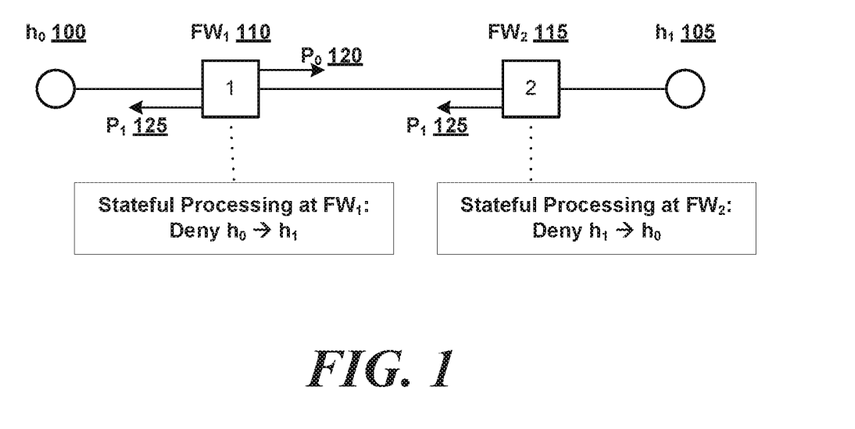
FIG. 1 illustrates an example intent-based stateful network in accordance with the present disclosure.

FIG. 1 illustrates an example intent-based stateful network in accordance with the present disclosure. Network intents are high-level network operating objectives. They may define how a traffic class should be forwarded, which network functions should be traversed. A "traffic class" refers to a group of sources and destinations. Network functions generally are security appliances (such as, firewalls, intrusion detection system, etc.), or performance appliances (such as, load balancer, caches, etc.). An example network intent policy may be, for example, hosts from a guest subnet should be able to reach subnet servers by going through a firewall and a load balancer (FW->LB). To make the intent specification more expressible, examples of the disclosed system may use regular expressions to specify packet processing requirements. For example, the regular expressions may specify that the matching packets should not go through certain network functions, or the packets should go through two continuous network functions without being redirected to other devices, etc.

Specifically, FIG. 1 illustrate stateful processing of network packets between two hosts $h_0$ 100 and $h_1$ 105. In this example, the two hosts $h_0$ 100 and $h_1$ 105 are connected through two firewalls $FW_1$ 110 and $FW_2$ 115. Assuming that two rules are configured for the firewalls: First, at firewall $FW_1$ 110, packets from host $h_0$ 100 to host $h_1$ 105 are denied. Second, packets from host $h_1$ 105 to host $h_0$ 100 are denied at firewall $FW_2$ 115. As a stateful firewall will allow incoming packets that belong to an established state, a packet $P_0$ 120 may still be able to pass through firewall $FW_1$ 110, for example, when there exist a previous reverse packet $P_1$ 125. However, to reach $FW_1$ 110, $P_1$ 125 should pass through $FW_2$ 115 first. This would be in conflict with the deny rule at $FW_2$ 115. In this example, when the previous reverse packet $P_1$ 125 is received at the stateful firewall $FW_1$ 110, the stateful firewall is set in an established state. Subsequently, when the packet $P_0$ 120 is received at firewall $FW_1$ 110 that is in an established state, the packet $P_0$ 120 will be allowed. In general, a state as referred here to can represent any type of information that a stateful firewall can extract from historical packet processing. In some examples, the forwarding decision made by a stateful firewall can be whether the state value is greater or less than a threshold value. In some examples, the forwarding decision made by a stateful firewall can be whether the state value equals a value corresponding to a particular state (e.g., 0 or 1). Therefore, in a stateful intent-based network, packet behaviors at a stateful network function are not only decided based on the incoming packet characteristics, but also based on previous packet processing history as well as related packet processing at other network functions. It is advantageous to model stateful network functions using temporal logic instead of static logic, because using static logic may lead a false positive that the end-to-end reachability can be achieved when both firewalls have a forward and reverse packet. However, those packets cannot form a valid sequence which can be detected when temporal modeling is used. Thus, temporal modeling provides more accurate verification of the reachability in stateful intent-based networks.

As used herein, "network functions" may employ a variety of actions. Such network functions may be virtualized network functions that are responsible for handling specific network functions that run on virtual machines over the hardware networking infrastructure (such as, routers, switches, servers, cloud computing systems, etc.). For example, network address translation (NAT) may be a network function that can remap one Internet Protocol (IP) address space into another by modifying network address information in IP datagram packet headers while they are transmitted across the network. Moreover, a load balancer may be a network function that can modify packet headers based on their configurations to distribute workloads across multiple computing resources, thereby achieving improved resource use, maximize throughput, minimize response time, and avoiding overload of any single network resource. In addition, a proxy may be a network function that works as an intermediate n between a client and a server, which terminates a request packet from the client and initiates a new packet to the server.

Figure 2:
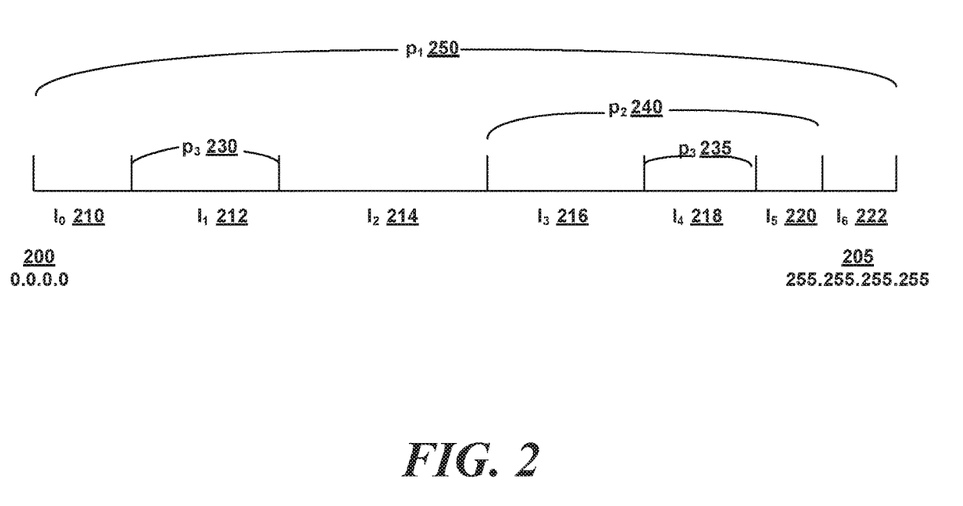
FIG. 2 illustrates an example atomic address object according to examples of the present disclosure.

FIG. 2 illustrates an example atomic address object according to examples of the present disclosure. To simplify NF management, the intent-based network policy verification system may define address objects (also referred to as "zones") that include a set of prefixes and/or addresses in NF configurations. For example, a set of security rules guarding servers in a data center allow traffic from hosts in marketing department while blocking mobile devices connected to guest network. Instead of expanding out all addresses each time a rule is added, atomic address objects are defined for the data center, the marketing department and the guest network in this example. Thus, a security rule can be directly applied to those atomic address objects.

Given the set of address objects from all NFs, the set of atomic address object can be defined to specify its largest common refinement over an address space. As is shown in FIG. 2, three address objects $p_1$ 250, $p_2$ 240 and $p_3$ 230/235 are represented as ranges with all the endpoints laid out on an axis in increasing order. The axis represents an entire header address space between 0.0.0.0 200 and 255.255.255.255 205 in this example. However, other address segments such as those in compliance with the IPv6 protocol may be used in similar fashion without departing from the spirit of the invention. Note that $p_3$ has two different ranges 230 and 235 as it corresponds to two non-continuous subnets. Six non-overlapping intervals $I_0$ 210, $I_1$ 212, $I_2$ 214, $I_3$ 216 $I_4$ 218, $I_5$ 220, and $I_6$ 222 are formed by each consecutive pair of such endpoints. The set of atomic address objects can be calculated by combining intervals that belong to the same set of address objects. For example, $I_1$ 212 and $I_4$ 218 are two separate atomic address objects. As another example, $I_0$ 210$\cup I_2$ 214$\cup I_6$ 222 represents another atomic address object. Furthermore, $I_3$ 216$\cup I_5$ 220 represents the fourth atomic address object. Each unique atomic address object correspond to addresses that are subject to the same actions in all the network functions.

In addition, an address object can be represented as a union of a subset of atomic address objects. For example, $p_2$ 240 may be represented as $I_3$ 216$\cup I_4$ 218$\cup I_5$ 220. As another example, $p_1$ 250 may be represented as $I_0$ 210$\cup I_1$ 212$\cup I_2$ 214$\cup I_3$ 216$\cup I_4$ 218$\cup I_5$ 220$\cup I_6$ 222.

Packets sent from one atomic address object to another atomic address object may be referred to as a traffic class. With the same network state, packets within the same traffic class may be treated equally at all NFs in the entire network because they match the same set of processing rules. An EPG in an intent can be represented as a union of atomic address objects whose intersection with the EPG is not empty. To check an intent with two EPGs, the system can check the intent for each traffic class between the two EPGs, For example, an intent from EPG $e_0$ to $e_1$ can be checked using two traffic classes $(s_0, d_0)$ and $(s_1, d_0)$. If $e_0 \cap s_{0,1} \neq \emptyset$, $e_0 \subset s_0 \cup s_1$, $e_1 \cap d_0 \neq \emptyset$ and $e_1 \subset d_0$.

Note that unlike IP address aggregation by prefixes in a routing table, the examples of the present disclosure provides aggregation of address objects based on both attributes and actions in the network functions. For example, in a firewall network function (NF), there may be two actions for packets, that is, either allow the packet or deny the packet. Accordingly, an example system according to the present disclosure can aggregate all the addresses that are associated with the source addresses of allowed packets by the firewall NF as a first atomic address object, and all the addresses that are associated with the source addresses of denied packets by the firewall NF as a second and different atomic address object.

In some examples, the configuration of atomic address objects may be accomplished by configuring a set of object names. For example, the first atomic address object may be configured as "headquarter campus" that includes all IP addresses belonging to devices located in a company's headquarter campus. The linking between the atomic address object and the set of object names may be derived from the rules associated with each NF, such as, firewall policies. When the IP addresses belonging to the devices located in the company's headquarter campus change, the system does not need to reconfigure the atomic address object.

Furthermore, because the system handles a plurality of various network functions, the system can aggregate network addresses that are associated with the same actions across a plurality of network middleboxes performing multiple NFs rather than a single network function. Each intent-based policy includes at least a rule and an action. The action indicates what would be performed on a packet if there is a match according to the rule. Therefore, address objects $p_1$ 250, $p_2$ 240, $p_3$ 230, and $p_3$ 235 can be defined based on the rules specified in each of the intent-based policies. Then, the system can determine the plurality of intervals $I_0$ 210 to $I_6$ 222 based on these definitions. Next, the system can combine the intervals together to define atomic address objects that are subject to the same actions in all the network functions. In the example illustrated in FIG. 2, assuming that address objects $p_1$ 250 may represent a first intent from which a deny rule at a firewall is derived; address objects $p_2$ 240 may represent a second intent from which a rule at a first load balancer is derived; and address objects $p_3$ 230 and $p_3$ 235 may represent a third intent from which another rule at a second and different load balancer is derived.

If a network packet's source (or destination) address falls within a particular address interval (e.g., $I_0$ 210 to $I_6$ 222), then the system can determine that the packet match a particular set of rules associated with a particular network function based on the set of address objects that overlap with the particular address interval. For example, network packets with addresses located within $I_0$ 210 are denied by the firewall $p_1$ 250 and do not satisfy any rules at either of the two load balancers because it is outside $p_2$ 240 and $p_3$ 230/235. As another example, network packets address located within $I_4$ 218 are denied by the firewall $p_1$ 250 and will trigger both load balancers because it satisfies the rule at the first load balancer $p_2$ 240 as well as the other rule at the second load balancer $p_3$ 235.

Figure 3:
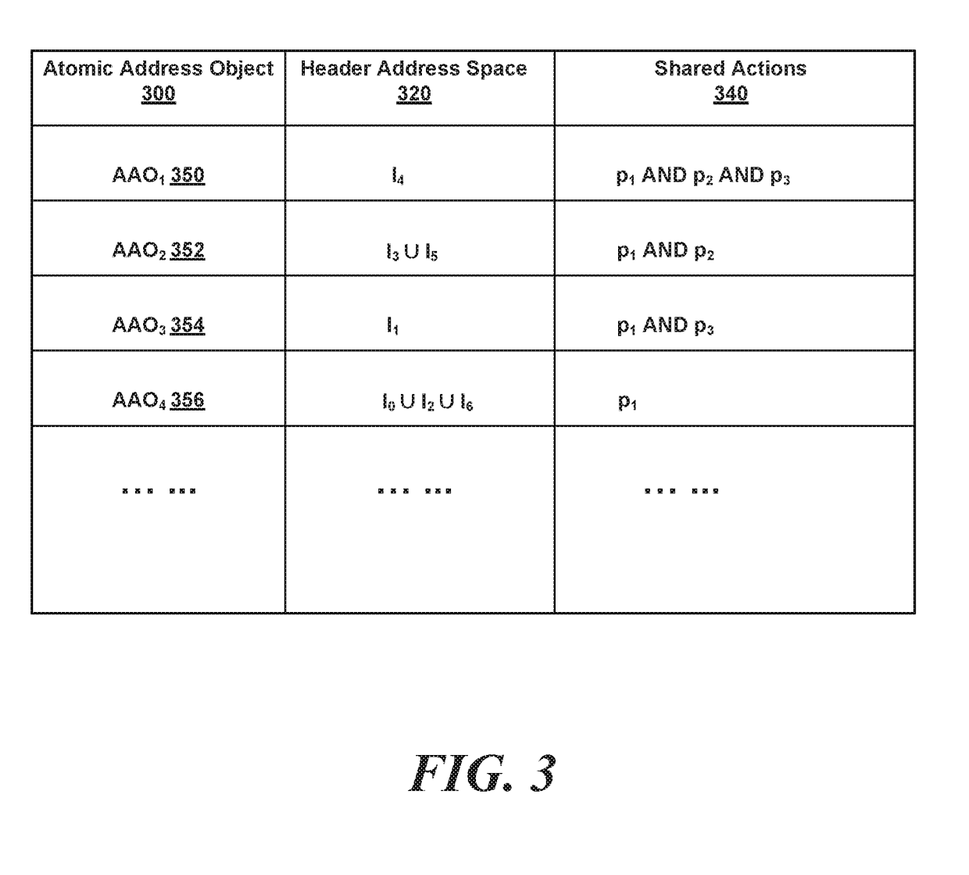
FIG. 3 illustrates an example atomic address object according to examples of the present disclosure.

FIG. 3 is a block diagram illustrating atomic address objects according to examples of the present disclosure. Specifically, based on the set of rules $p_1$ 250, $p_2$ 240, and $p_3$ 230/235 that are derived from the example intent-based policies according to FIG. 2, at least four atomic address objects 300, namely $AAO_1$ 350, $AAO_2$ 352, $AAO_3$ 354, and $AAO_4$ 356, can be determined based on shared actions corresponding to the set of rules. The header address space 320 represent the combined header address space for each of the atomic address object. The shared actions 340 indicates the set of matching rules shared by all addresses in each atomic address object.

For example, $AAO_1$ 350 may include any address that falls within the header address interval $I_4$, and each address in the $AAO_1$ 350 satisfies all three rules $p_1$, $p_2$, and $p_3$, Also, $AAO_2$ 352 may include any address that falls within the header address interval $I_3 \cup I_5$, and each address in the $AAO_2$ 352 satisfies both rule $p_1$ and rule $p_2$ but not rule $p_3$. Similarly, $AAO_3$ 354 may include any address that falls within the header address interval $I_1$, and each address in the $AAO_3$ 354 satisfies both rule $p_1$ and rule $p_3$ but not rule $p_2$. In addition, $AAO_4$ 356 may include any address that falls within the header address interval $I_0 \cup I_2 \cup I_6$, and each address in the $AAO_4$ 356 satisfies only rule $p_1$ but not rule $p_2$ and rule $p_3$.

Figure 4:
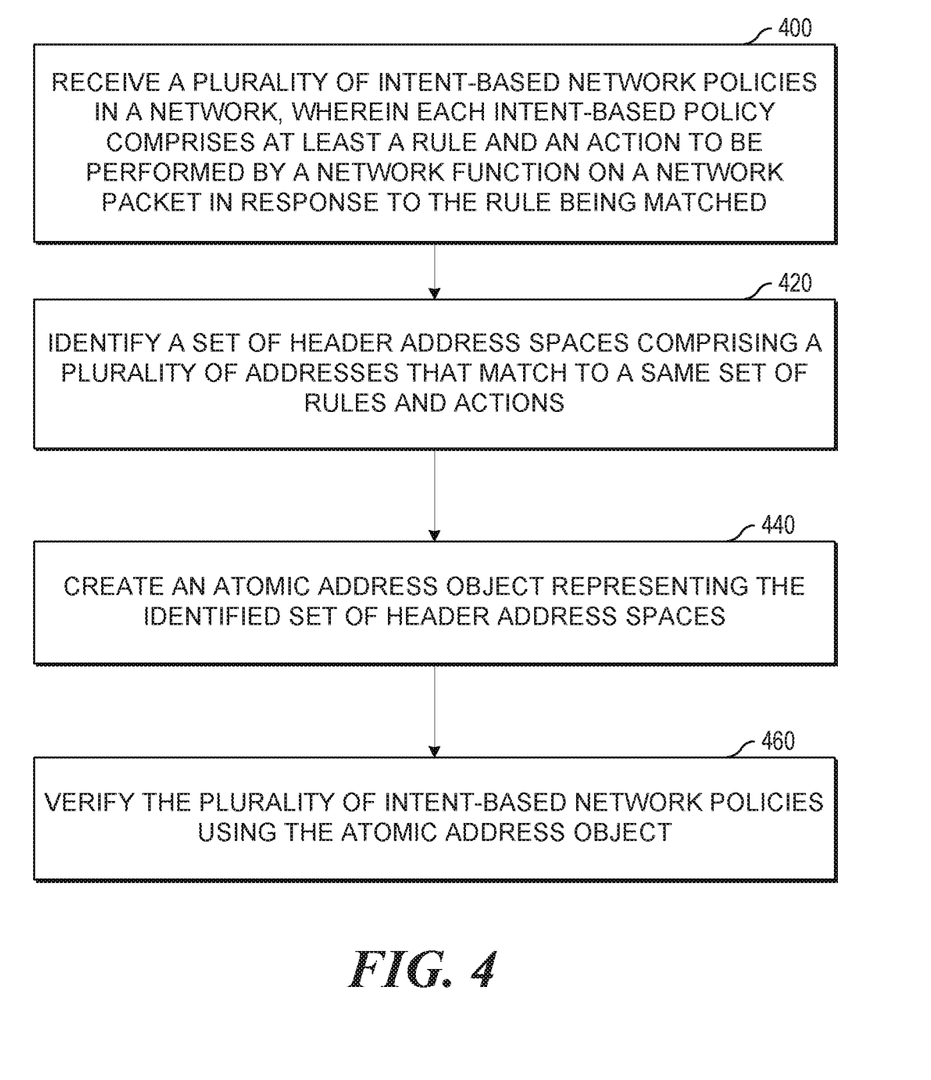
FIG. 4 is a flowchart of an example process of verifying intents in stateful networks using atomic address objects according to the present disclosure.

FIG. 4 is a flowchart of an example process of verifying network intent policies in an intent-based stateful network. During operations, a processor of a network device may receive a plurality of intent-based network policies in a network (operation 400). Each intent-based policy may include at least a rule and an action to be performed by a network function on a network packet in response to the rule being matched.

Furthermore, the network device may identify a set of header address spaces comprising a plurality of addresses that match to a same set of rules and actions (operation 420). Specifically, the network device can determine a plurality of non-overlapping address space intervals based on a plurality of rules corresponding to the plurality of intent-based network policies. Then, the network device can identify a subset of non-overlapping address space intervals that match to the same set of rules and actions. Thereafter, the network device can combine the subset of non-overlapping address space intervals that match to the same set of rules and actions in order to identify the set of header address spaces.

Then, the network device can create an atomic address object representing the identified set of header address spaces (operation 440). Next, the network device can verify the plurality of intent-based network policies using the atomic address object (operation 460).

In some examples, the atomic address object comprise at least two non-continuous subset of address space intervals. In some examples, all addresses corresponding to the atomic address object are associated with the same actions across all network functions.

In some examples, packets sent from a first atomic address object to a second atomic address object forms a unique traffic class, and wherein packets within the same traffic class is treated equally across network functions in the network. In those examples, verifying a particular intent-based network policy between two endpoint groups (EPGs) may be performed by checking corresponding intents for each traffic class between the two EPGs.

In some examples, the network function may include a stateful firewall, a network address translator, a load balancer, and/or a reverse proxy.

In some examples, verifying the plurality of intent-based network policies using the atomic address object may include modeling header matching in a lookup table of network functions as integer membership check. It is more efficient to verify such intent-based network policies using SMT solvers and atomic address objects than to modeling header matching using bit vectors.

In some examples, verifying the plurality of intent-based network policies using the atomic address object can solve reachability in temporal modeling. Specifically, the example system can solve the reachability in temporal modeling without using the negation technique. The network device can determine a reachability between the at least two endpoints along an identified path. Then, the computing device can use the encoding of the network function to determine how the network function along the identified path processes network packets. Next, the network device can use a satisfiability modulo theories (SMT) solver to determine whether the at least one path between the at least two endpoints exists. In particular, the network device can determine a plurality of feasible paths of network packets between at least two endpoints in the intent-based stateful network.

Figure 5:
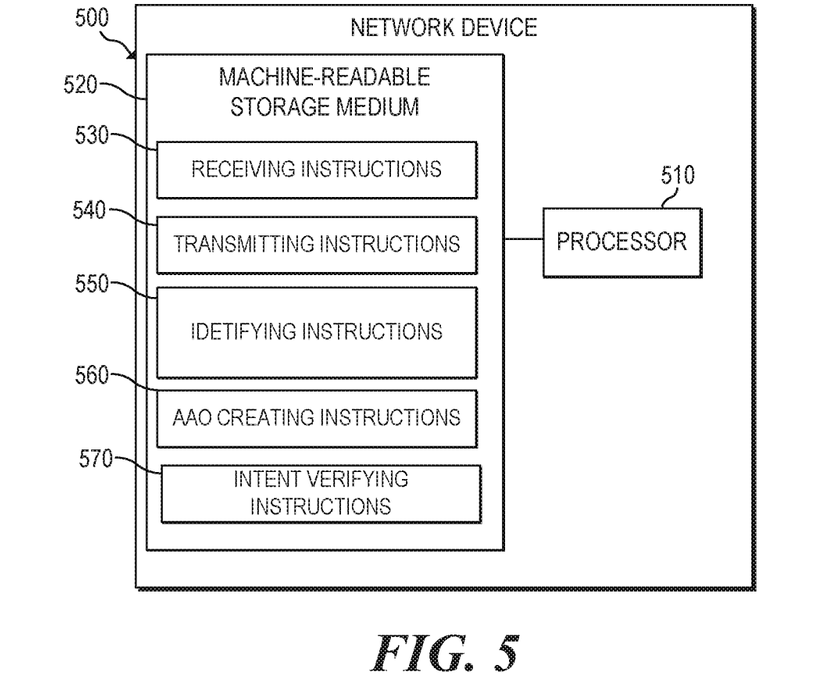
FIG. 5 is a block diagram of an example computing device to verify intents in stateful networks using atomic address objects according to the present disclosure.

FIG. 5 is a block diagram of an example network device to verify network intents in intent-based stateful networks using atomic address objects according to the present disclosure. As used herein, a network device may be implemented, at least in part, by a combination of hardware and programming. For example, the hardware may comprise at least one processor (e.g., processor 510 which may include one main processor and a plurality of co-processors) and the programming may comprise instructions, executable by the processor(s), stored on at least one machine-readable storage medium (e.g., 520). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 510 may fetch, decode, and execute instructions stored on storage medium 520 to perform the functionalities described below in relation to receiving instructions 530, transmitting instructions 540, identifying instructions 550, AAO creating instructions 560, and intent verifying instructions 570. In other examples, the functionalities of any of the instructions of storage medium 520 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 5, storage medium 520 may be implemented by one machine-readable storage medium, or multiple machine-readable storage media.

Although network device 500 includes at least one processor 510 and machine-readable storage medium 520, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 530-570 may be executed by processor 510 to: receive a plurality of intent-based network policies in a network, wherein each intent-based policy comprises at least a rule and an action to be performed by a network function on a network packet in response to the rule being matched; identify a set of header address spaces comprising a plurality of addresses that match to a same set of rules and actions; determine a plurality of non-overlapping address space intervals based on a plurality of rules corresponding to the plurality of intent-based network policies; identify a subset of non-overlapping address space intervals that match to the same set of rules and actions; identify the set of header address spaces by combining the subset of non-overlapping address space intervals that match to the same set of rules and actions; create an atomic address object representing the identified set of header address spaces; verify the plurality of intent-based network policies using the atomic address object; verify a particular intent-based network policy between two endpoint groups (EPGs) by checking corresponding intents for each traffic class between the two EPGs; etc.

We claim:

1. A method comprising:
receiving, by a network device, a plurality of intent-based network policies in a network, wherein each intent-based policy comprises at least a rule associated with a network intent defined using logical terms and an action to be performed by a network function on a network packet in response to the rule being matched, and further wherein the network comprises an intent-based stateful network and the network function comprises a stateful processing of the network packet;
identifying, by the network device, a set of header address spaces comprising a plurality of addresses that match to a same set of rules and actions;
creating, by the network device, an atomic address object representing the identified set of header address spaces; and
verifying, by the network device, the plurality of intent-based network policies using the atomic address object.

2. The method of claim 1, further comprising:
determining a plurality of non-overlapping address space intervals based on a plurality of rules corresponding to the plurality of intent-based network policies;
identifying a subset of non-overlapping address space intervals that match to the same set of rules and actions; and
identifying the set of header address spaces by combining the subset of non-overlapping address space intervals that match to the same set of rules and actions.

3. The method of claim 1, wherein the atomic address object comprise at least two non-continuous subset of address space intervals.

4. The method of claim 1, wherein all addresses corresponding to the atomic address object are associated with the same actions across all network functions.

5. The method of claim 1, wherein packets sent from a first atomic address object to a second atomic address object forms a unique traffic class, and wherein packets within the same traffic class is treated equally across network functions in the network.

6. The method of claim 5, further comprising:
verifying a particular intent-based network policy between two endpoint groups (EPGs) by checking corresponding intents for each traffic class between the two EPGs.

7. The method of claim 1, wherein the network function comprises at least one of a stateful firewall, a network address translator, a load balancer, and a reverse proxy.

8. The method of claim 1, wherein verifying the plurality of intent-based network policies using the atomic address object comprises modeling header matching in a lookup table of network functions as integer membership check.

9. The method of claim 1, wherein verifying the plurality of intent-based network policies using the atomic address object solves reachability in temporal modeling.

10. The method of claim 1, wherein a network intent defined using logical terms comprises at least one of: technology-agnostic terms, logical labels, or tags.

11. The method of claim 1, wherein the stateful processing of the network packet comprises processing of the network packets to decide a network packet behavior based on previous packet processing history, related packet processing at other network functions, or an endpoint observed in the past.

12. A network device comprising at least:
a memory;
a processor executing instructions in the memory to:
receive a plurality of intent-based network policies in a network, wherein each intent-based policy comprises at least a rule associated with a network intent defined using logical terms and an action to be performed by a network function on a network packet in response to the rule being matched, and further wherein the function comprises a stateful processing of the network packet;
identify a set of header address spaces comprising a plurality of addresses that match to a same set of rules and actions;
create an atomic address object representing the identified set of header address spaces; and
verify the plurality of intent-based network policies using the atomic address object.

13. The network device of claim 12, wherein the process further executing instructions in the memory to:
determine a plurality of non-overlapping address space intervals based on a plurality of rules corresponding to the plurality of intent-based network policies;
identify a subset of non-overlapping address space intervals that match to the same set of rules and actions; and
identify the set of header address spaces by combining the subset of non-overlapping address space intervals that match to the same set of rules and actions.

14. The network device of claim 12, wherein the atomic address object comprise at least two non-continuous subset of address space intervals.

15. The network device of claim 12, wherein all addresses corresponding to the atomic address object are associated with the same actions across all network functions.

16. The network device of claim 12, wherein packets sent from a first atomic address object to a second atomic address object forms a unique traffic class, and wherein packets within the same traffic class is treated equally across network functions in the network.

17. The network device of claim 16, wherein the process further executing instructions in the memory to:
verify a particular intent-based network policy between two endpoint groups (EPGs) by checking corresponding intents for each traffic class between the two EPGs.

18. The network device of claim 12, wherein the network function comprises at least one of a stateful firewall, a network address translator, a load balancer, and a reverse proxy.

19. The network device of claim 12, wherein verifying the plurality of intent-based network policies using the atomic address object comprises modeling header matching in a lookup table of network functions as integer membership check.

20. The network device of claim 12, wherein verifying the plurality of intent-based network policies using the atomic address object solves reachability in temporal modeling.

21. A non-transitory machine-readable storage medium encoded with instructions executable by a processor of a computing device, the non-transitory machine-readable storage medium comprising instructions to:
receive a plurality of intent-based network policies in a network, wherein each intent-based policy comprises at least a rule based on a network intention and an action to be performed by a network function on a network packet in response to the rule being matched, and further wherein the network comprises an intent-based stateful network and the network function comprises a stateful processing of the network packet;

identify a set of header address spaces comprising a plurality of addresses that match to a same set of rules and actions;

create an atomic address object representing the identified set of header address spaces; and verify the plurality of intent-based network policies using the atomic address object.

22. The non-transitory machine-readable storage medium of claim 21, further comprising instructions to:

determine a plurality of non-overlapping address space intervals based on a plurality of rules corresponding to the plurality of intent-based network policies;

identify a subset of non-overlapping address space intervals that match to the same set of rules and actions; and identify the set of header address spaces by combining the subset of non-overlapping address space intervals that match to the same set of rules and actions.

* * * * *